United States Patent
Wilhelmsson et al.

(10) Patent No.: US 12,328,282 B2
(45) Date of Patent: Jun. 10, 2025

(54) ACKNOWLEDGEMENT FOR SIMULTANEOUS TRANSMISSION AND RECEPTION

(71) Applicant: Telefonaktiebolaget LM Ericsson (publ), Stockholm (SE)

(72) Inventors: Leif Wilhelmsson, Lund (SE); Lakshmikanth Guntupalli, Lund (SE); Naveed Butt, Lund (SE); Rocco Di Taranto, Lund (SE); Dennis Sundman, Sollentuna (SE); Miguel Lopez, Solna (SE); Mehmet Burak Guldogan, Stockholm (SE); Guido Roland Hiertz, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 803 days.

(21) Appl. No.: 17/294,758

(22) PCT Filed: Nov. 22, 2018

(86) PCT No.: PCT/EP2018/082276
§ 371 (c)(1),
(2) Date: May 18, 2021

(87) PCT Pub. No.: WO2020/104037
PCT Pub. Date: May 28, 2020

(65) Prior Publication Data
US 2022/0021503 A1  Jan. 20, 2022

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0003* (2013.01); *H04L 1/1854* (2013.01); *H04L 1/189* (2013.01); *H04W 24/08* (2013.01)

(58) Field of Classification Search
CPC .............................. H04L 69/22; G06F 13/423
(Continued)

(56) References Cited

U.S. PATENT DOCUMENTS

| 8,589,752 B2 | 11/2013 | David et al. |
| 8,855,067 B2 | 10/2014 | Liu et al. |

(Continued)

FOREIGN PATENT DOCUMENTS

| CN | 101911568 A | 12/2010 |
| CN | 101960819 A | 1/2011 |

(Continued)

OTHER PUBLICATIONS

Xin, Y. et al., "Technical Report on Full Duplex for 802.11", IEEE P802.11 Wireless LANs, Sep. 14, 2018, pp. 1-43.
(Continued)

*Primary Examiner* — Kiet M Doan
(74) *Attorney, Agent, or Firm* — COATS & BENNETT, PLLC

(57) ABSTRACT

Methods are disclosed for communication devices capable of simultaneous transmission and reception, wherein a first method is for reception of a packet comprising a header and a payload and a second method is for transmission of a packet comprising a header and a payload. The second method comprises transmitting at least a part of the header. The first method comprises receiving at least a part of the header, attempting to decode the part of the header, and (when the part of the header is successfully decoded) transmitting a header acknowledgement signal. The second method comprises monitoring receipt of a header acknowl- (Continued)

edgement signal, and (when absence of the header acknowledgement signal is detected) interrupting the transmission of the packet and scheduling the packet for retransmission. Corresponding apparatuses, transceivers, communication devices and computer program products are also disclosed.

9 Claims, 3 Drawing Sheets

(51) Int. Cl.
*H04L 1/1829* (2023.01)
*H04L 1/1867* (2023.01)
*H04W 24/08* (2009.01)

(58) Field of Classification Search
USPC .............................. 375/343, 240.01; 348/466
See application file for complete search history.

(56) References Cited

U.S. PATENT DOCUMENTS

| | | | |
|---|---|---|---|
| 9,137,704 | B2 | 9/2015 | Cordeiro et al. |
| 2005/0226159 | A1 | 10/2005 | Terry et al. |
| 2007/0223495 | A1* | 9/2007 | Fukui ................... H04W 88/08 370/395.64 |
| 2008/0242236 | A1* | 10/2008 | Spencer ................ H04L 1/1671 455/73 |
| 2009/0034488 | A1 | 2/2009 | Takagi |
| 2013/0235781 | A1 | 9/2013 | Dangui et al. |
| 2014/0016461 | A1* | 1/2014 | Ishikawa ................. H04L 47/35 370/230 |
| 2014/0126580 | A1 | 5/2014 | Sampath et al. |
| 2014/0226580 | A1 | 8/2014 | Torsner et al. |
| 2014/0362838 | A1* | 12/2014 | Choi ..................... H04L 1/1664 370/338 |
| 2015/0049690 | A1 | 2/2015 | Sambhwani et al. |
| 2016/0301563 | A1 | 10/2016 | Erdmann |
| 2017/0311201 | A1* | 10/2017 | Uchino ................. H04L 1/1825 |
| 2019/0021085 | A1* | 1/2019 | Mochizuki ............ H04W 72/02 |
| 2020/0083989 | A1 | 3/2020 | Göktepe et al. |

FOREIGN PATENT DOCUMENTS

| | | |
|---|---|---|
| CN | 102870341 A | 1/2013 |
| CN | 105208597 A | 12/2015 |
| CN | 105960770 A | 9/2016 |
| CN | 107770823 A | 3/2018 |
| EC | 15126281 A | 1/2016 |
| EP | 1708420 A1 | 10/2006 |
| JP | 2002026984 A | 1/2002 |
| JP | 2014082578 A | 5/2014 |
| KR | 20080043042 A | 5/2008 |
| KR | 20080100829 A | 11/2008 |
| KR | 101306210 B1 | 9/2013 |
| RU | 2581778 C2 | 4/2016 |
| WO | 2005101719 A1 | 10/2005 |
| WO | 201400311 A1 | 5/2014 |
| WO | 2018206398 A1 | 11/2018 |

OTHER PUBLICATIONS

Taori, R. et al., "Considerations for In-Band Simultaneous Transmit and Receive (STR) feature in HEW", doc.: IEEE 11-13/1122r1, Sep. 16, 2013, pp. 1-28.
Perahia, E. et al., "Next Generation Wireless LANs Throughput, Robustness, and Reliability in 802.11n", Cambridge University Press, 2008, pp. 1-417.

* cited by examiner

ACKNOWLEDGEMENT FOR SIMULTANEOUS TRANSMISSION AND RECEPTION

TECHNICAL FIELD

The present disclosure relates generally to the field of wireless communication. More particularly, it relates to acknowledgement for simultaneous transmission and reception.

BACKGROUND

One challenge in wireless communication is the latency of feed-back mechanisms. In particular, adaptations to the communication setting may be delayed due to such latency, when the adaptations depend on information provided by the feed-back mechanisms.

Examples of adaptations include selection of modulation and coding schemes (MCS), retransmission decision, interruption of an ongoing transmission, etc. Examples of feedback include acknowledgment signals (ACK), negative acknowledgements signals (NACK), channel quality indicator (CQI), channel state information (CSI), etc.

Therefore, there is a need for alternative feed-back mechanisms for wireless communication. Preferably, such alternative feed-back mechanisms should provide improvement in adaptations to the communication setting. For example, such alternative feed-back mechanisms might enable faster adaptations due to decreased latency of the feed-back.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a communication device capable of simultaneous transmission and reception, wherein the method is for reception of a packet comprising a header and a payload.

The method comprises receiving at least a part of the header, attempting to decode the part of the header, and (when the part of the header is successfully decoded) transmitting a header acknowledgement signal.

In some embodiments, the method further comprises receiving the payload, attempting to decode the payload, and (when the payload is successfully decoded) transmitting a packet acknowledgement signal.

In some embodiments, the transmission of the header acknowledgement signal is performed prior to, or during, reception of the payload.

In some embodiments, the part of the header comprises a header field indicative of a packet recipient address.

In some embodiments, the method further comprises receiving the header in entirety, and (when the header matches a previously received header of a previously received and successfully decoded packet) retransmitting a previously transmitted packet acknowledgement signal associated with the previously received and successfully decoded packet.

In some embodiments, the method further comprises transmitting an indication of a recommended packet modulation and coding scheme together with the header acknowledgement signal.

In some embodiments, the transmission of the header acknowledgement signal is performed using an acknowledgement modulation and coding scheme that is more robust than a currently applied packet modulation and coding scheme.

A second aspect is a method for a communication device capable of simultaneous transmission and reception, wherein the method is for transmission of a packet comprising a header and a payload.

The method comprises transmitting at least a part of the header, monitoring receipt of a header acknowledgement signal, and (when absence of the header acknowledgement signal is detected) interrupting the transmission of the packet and scheduling the packet for retransmission.

In some embodiments, the method further comprises transmitting the header in entirety, monitoring receipt of a premature packet acknowledgment signal, and (when the premature packet acknowledgement signal is detected) interrupting the transmission of the packet.

In some embodiments, the method further comprises transmitting the payload monitoring receipt of a packet acknowledgement signal, and (when absence of the packet acknowledgement signal is detected) scheduling the packet for retransmission.

In some embodiments, detection of absence of the packet acknowledgment signal comprises detection of an explicit packet non-acknowledgement signal.

In some embodiments, the part of the header comprises a header field indicative of a packet recipient address.

In some embodiments, the method further comprises receiving an indication of a recommended packet modulation and coding scheme together with the header acknowledgement signal, and using the recommended packet modulation and coding scheme for transmission of an immediately subsequent packet.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a communication device capable of simultaneous transmission and reception, wherein the apparatus is for reception of a packet comprising a header and a payload.

The apparatus comprises controlling circuitry configured to cause reception of at least a part of the header, an attempt to decode the part of the header, and (responsive to the part of the header being successfully decoded) transmission of a header acknowledgement signal.

A fifth aspect is an apparatus for a communication device capable of simultaneous transmission and reception, wherein the apparatus is for transmission of a packet comprising a header and a payload.

The apparatus comprises controlling circuitry configured to cause transmission of at least a part of the header, monitoring of receipt of a header acknowledgement signal, and (responsive to detection of absence of the header acknowledgement signal) interruption of the transmission of the packet and scheduling of the packet for retransmission.

A sixth aspect is a transceiver for a communication device, the transceiver comprising the apparatus of any of the fourth and fifth aspect.

A seventh aspect is a communication device comprising the transceiver of the sixth aspect and/or the apparatus of any of the fourth and fifth aspect.

In some embodiments, any of the above aspects may additionally have features identical with or corresponding to any of the various features as explained above for any of the other aspects.

An advantage of some embodiments is that alternative feed-back mechanisms for wireless communication are provided.

Another advantage of some embodiments is that the alternative feed-back mechanisms provide improvement in adaptations to the communication setting (e.g., one or more of: MCS selection, retransmission decision, and transmission interruption).

Yet an advantage of some embodiments is that the alternative feed-back mechanisms enable faster adaptations due to decreased latency of the feed-back.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Various examples of some embodiments will be given below in the context of IEEE 802.11. It should be noted that these examples are not intended as limiting. Contrarily, they are merely intended as illustrative. Thus, problems and embodiments may be equally applicable in any scenario with communication devices capable of simultaneous transmission and reception. When referred to herein, a communication device capable of simultaneous transmission and reception may be defined as a communication device that is configured to perform simultaneous transmission and reception.

In the following, embodiments will be described where alternative feed-back mechanisms for wireless communication are provided. The mechanisms are for a communication device capable of simultaneous transmission and reception. Examples of scenarios of simultaneous transmission and reception include full duplex communication scenarios, frequency division duplex (FDD) scenarios, etc.

The communication device may, for example, be a wireless communication device (e.g., a user equipment, UE, or a station, STA) or a network node (e.g., a base station, BS, a NodeB, an evolved NodeB, or an access point, AP).

The alternative feed-back mechanisms for wireless communication presented herein are for communication of one or more packets, wherein each packet comprises a header and a payload. The packet may also be denoted as a frame in some contexts.

Figure 1:
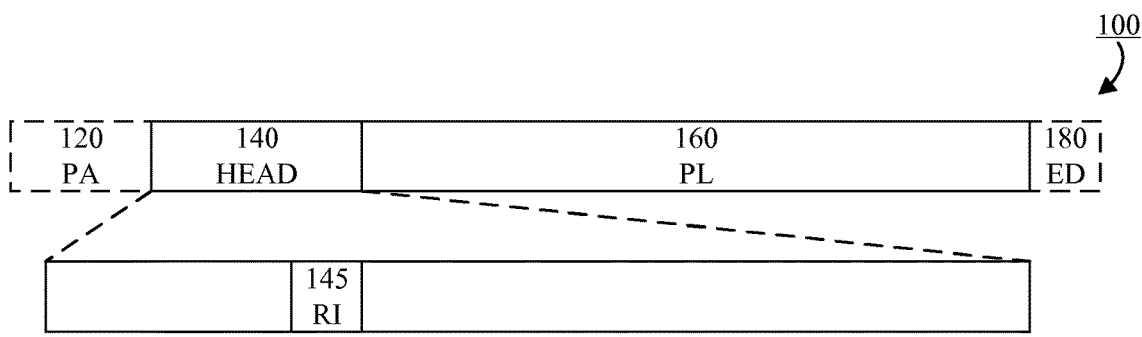
FIG. 1 is a schematic drawing illustrating a packet according to some embodiments.

FIG. 1 schematically illustrates an example of such a packet according to some embodiments. The example packet 100 comprises a header (HEAD) 140 and a payload (PL) 160. The header may be subdivided in two or more header fields for various purposes. This is exemplified in FIG. 1 in that the header 140 comprises a receiver indictor field (RI) 145. The receiver indictor may, for example, be a receiver address.

The packet may also comprise one or more other components, which is exemplified in FIG. 1 by a preamble (PA) 120 and an error detection component (ED) 180. The error detection component may, for example, comprise a cyclic redundancy check (CRC) or a frame check sequence (FCS).

When the wireless communication is in accordance with an IEEE 802.11 standard (e.g., the IEEE 802.11n standard), the example packet 100 may comprise a physical (PHY) layer preamble 120 and a Medium Access Control (MAC) Protocol Data Unit (MPDU), wherein the MPDU itself comprises an MPDU header 140, an MPDU payload 160, and an FCS 180.

A typical MPDU header 140 may comprise a frame control field (two octets), a duration/identity (ID) field (two octets), a first address field (six octets) which carries the receiver address 145, a second address field (six octets), a third address field (six octets), a sequence control field (two octets), a fourth address field (six octets), a quality of service (QoS) control field (two octets), and a high throughput (HT) control field (four octets).

The frame control field comprises information about the type of MPDU. Depending on the type of MPDU, one or more of the header fields may be non-present. However, the first address field which carries the receiver address 145 is typically always present in current IEEE 802.11 MPDU packets.

Since the first address field of the MPDU is relatively large (six octets, i.e., 48 bits), the probability that an error in the first address field translates into an address that matches another receiver is relatively small.

It should also be noted that the first address field appears early in the MPDU, and early in the MPDU header (before any of the optional header fields). Thus, the duration from the beginning of the packet to the end of the first address field is deterministic (although typically dependent on the applied modulation and coding scheme, MCS).

There has been activity in IEEE 802.11 regarding simultaneous transmit and receive (STR) often referred to as full duplex (FD) technology. In IEEE, STR will probably use the same frequency band at the same time in both uplink (UL) and downlink (DL). Thus, full duplex is not yet standardized by IEEE 802.11, but there is ongoing work to do so.

A naïve extension of the existing packet ACK approach used for half duplex in IEEE 802.11 could be implemented such that the transmitter side communication device monitors receipt of a packet ACK during a period after the packet is fully transmitted (as in a half duplex scenario), wherein the monitoring is performed while the transmitter is free to start other activities—for example transmitting a next packet—directly after transmitting the packet (due to the full duplex capability).

As mentioned above, a challenge in wireless communication is the latency of feed-back mechanisms, which may result in delayed adaptations to the communication setting. Some embodiments mitigate this problem by exploiting the capability of simultaneous transmission and reception.

When encoding is performed without time interleaving (as in IEEE 802.11), decoding of a packet (e.g. an MPDU) can start immediately, even before the entire packet is received. Thus, under the assumptions that the packet will be correctly decoded, the information in the header is available before the payload is decoded. In absence of error detection for the header, it is not known whether it was correctly decoded until the decoder has decoded the full packet.

Considering the receiver indicator field 145, there are two sorts of errors that can occur from the receiver perspective; missed detection and false alarm. For a missed detection (packet that should be received is considered as intended for another receiver), the packet will be considered lost and will be retransmitted. For a false alarm (packet that is intended for another receiver is processed in entirety), the packet error detection will notice the error when the entire packet is decoded. Missed detection may occur in the same order as the packet error rate, while false alarm will typically occur with negligible probability provided that the address space is large. For example, the probability of false alarm is in the order of $1/2^{48}$ if the address field is 48 bits long. Thus, it may be safe for a communication device to assume that a packet is intended for it when the receiver indicator field of the packet header is indicative of the receiver address of the communication device.

Figure 2:
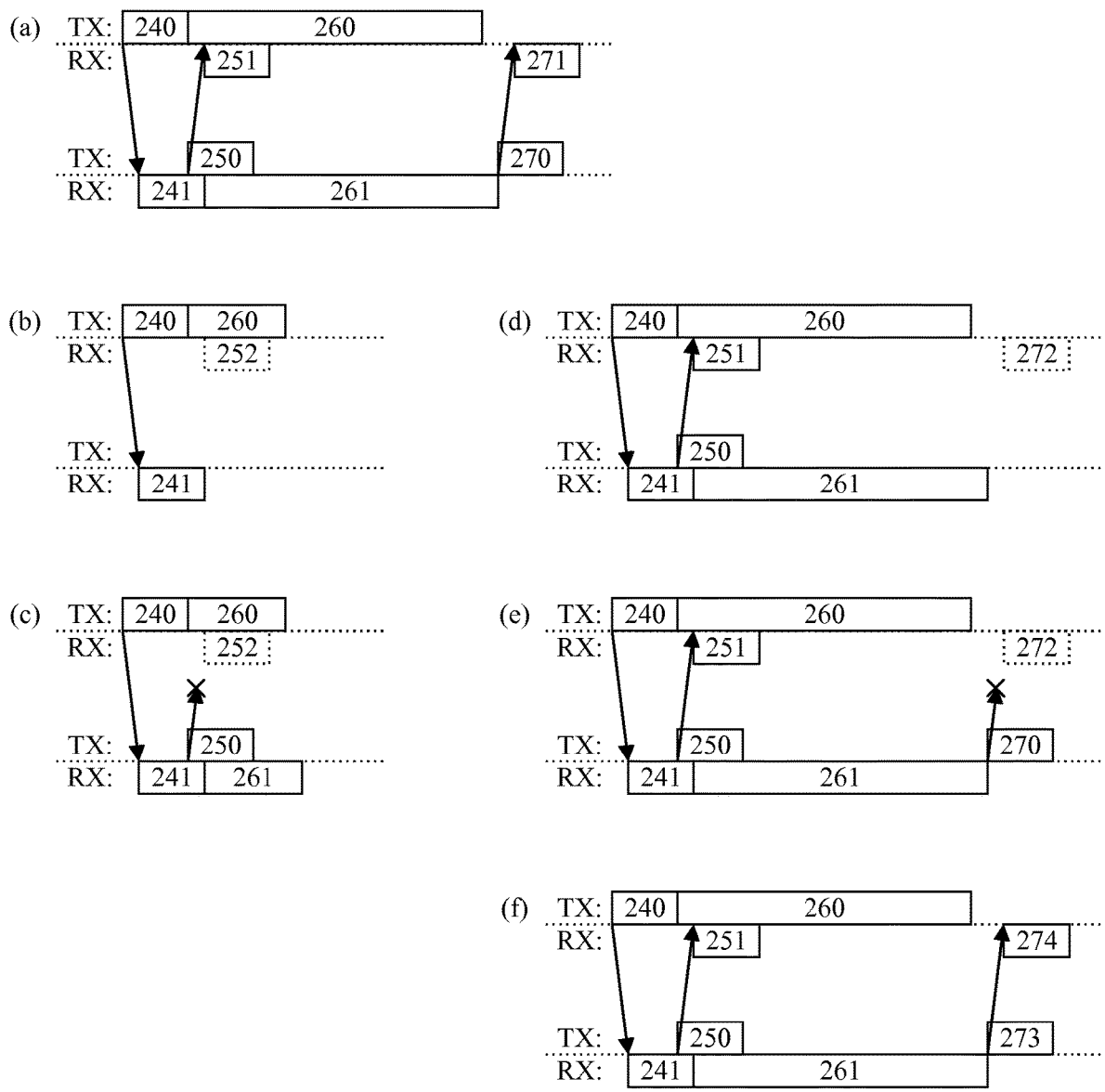
FIG. 2 is a schematic drawing illustrating various signaling scenarios according to some embodiments.

By exploiting the capability of simultaneous transmission and reception, a scheme with a separate acknowledgement for the header (or part of the header) may be considered, as will be exemplified in FIG. 2.

FIG. 2 schematically illustrates various signaling scenarios (a-f) according to some embodiments, where the capability of simultaneous transmission and reception is exploited to reduce the latency of feed-back mechanisms.

Generally, the upper part of each scenario illustration represents the activities of a first communication device configured to transmit (TX) a packet comprising a header (240) and a payload (260) and receive (RX) feedback associated with the packet, while the lower part of each scenario illustration represents the activities of a second communication device configured to receive (RX) the packet comprising a header (241) and a payload (261) and transmit (TX) feedback associated with the packet.

Scenario (a) illustrates the principles of an approach where the capability of simultaneous transmission and reception is exploited to reduce the latency of feed-back mechanisms. Initiation of the packet transmission is illustrated by the left-most arrow directed downwards.

When the second communication device has received at least a part of the header (241, compare with 140 of FIG. 1) it attempts to decode the part of the header. Typically, the part of the header comprises a header field indicative of a packet recipient address (compare with 145 of FIG. 1). However, it is not excluded that the part of the header may, additionally or alternatively, comprise other information that enables a determination regarding whether or not the header should be considered (correctly) received. Examples of such other information includes an error detection field for the header.

When the part of the header is successfully decoded, the second communication device transmits a header acknowledgement signal (H-ACK) 250. As can be seen in scenario (a) of FIG. 1, the H-ACK is transmitted while reception of the packet (e.g. reception of the rest of the header 241 and/or of the payload 261) is still ongoing, which is possible since the second communication device is capable of simultaneous transmission and reception.

The H-ACK 251 is received by the first communication device while transmission of the packet (e.g. transmission of the rest of the header 240 and/or of the payload 260) is still ongoing, which is possible since the first communication device is capable of simultaneous transmission and reception.

When the second communication device has received the payload (261, compare with 160 of FIG. 1) it attempts to decode the payload. When the payload is successfully decoded, the second communication device transmits a packet acknowledgement signal (P-ACK) 270. The P-ACK may be transmitted while reception (e.g., of a next packet) is ongoing, which is possible since the second communication device is capable of simultaneous transmission and reception. The P-ACK 271 may be received by the first communication device while transmission (e.g., of a next packet) is ongoing, which is possible since the first communication device is capable of simultaneous transmission and reception.

Scenario (b) illustrates a situation where the part of the header is not successfully decoded. Non-successful decoding of the part of the header may, for example, comprise determining that a receiver indicator field (compare with 145 of FIG. 1) does not indicate the second communication device as an intended receiver of the packet. This may, for example, happen due to errors in the receiver indicator field or due to that the packet is intended for another communication device.

When the part of the header is not successfully decoded, the second communication device does not transmit any H-ACK as can be seen in scenario (b). If the packet was intended for the second communication device, the first communication device will not receive any H-ACK in the monitoring period 252 (i.e., absence of the H-ACK is detected; implicit H-NACK). Then, the first communication device may interrupt (abort) transmission of the packet as illustrated by the shortened payload 260 in scenario (b), and schedule the packet for retransmission.

Thus, it is indicated early that the packet will not be correctly received. By adapting to this early indication, unnecessary transmission is reduced.

Scenario (c) illustrates a situation where the part of the header is successfully decoded but the H-ACK is not (correctly) received by the first communication device. Thus, the second communication device transmits the H-ACK 250 while reception of the packet (e.g. reception of the rest of the header 241 and/or of the payload 261) is still ongoing, but the first communication device will not receive any H-ACK in the monitoring period 252 (i.e., absence of the H-ACK is detected; implicit H-NACK). Then, the first communication device may interrupt (abort) transmission of the packet as illustrated by the shortened payload 260, 261 in scenario (c), and schedule the packet for retransmission.

Thus, in this scenario the packet transmission is interrupted even though it might have been correctly received.

Scenario (d) illustrates a situation where the payload is not successfully decoded. Non-successful decoding of the payload may, for example, comprise determining that an error detection component (compare with 180 of FIG. 1) indicates that the payload comprises errors.

When the payload is not successfully decoded, the second communication device does not transmit any P-ACK as can be seen in scenario (d), and the first communication device will not receive any P-ACK in the monitoring period 272 (i.e., absence of the P-ACK is detected; implicit P-NACK). In some embodiments, the second communication device transmits a P-NACK in scenario (d), and the first communication device will receive the P-NACK in the monitoring period 272 (i.e., absence of the P-ACK is detected; explicit P-NACK). In either case, the first communication device may schedule the packet for retransmission when absence of the P-ACK is detected.

Scenario (e) illustrates a situation where the payload is successfully decoded but the P-ACK is not (correctly) received by the first communication device. Thus, the second communication device transmits the P-ACK 270, but the first communication device will not receive any P-ACK in the monitoring period 272 (i.e., absence of the P-ACK is detected; implicit P-NACK). Then, the first communication device may schedule the packet for retransmission.

Thus, in this scenario the packet is scheduled for retransmission even though it has been correctly received. A mitigation of this drawback will be explained in connection with FIG. 3.

Scenario (f) illustrates a situation where the payload is successfully decoded and the P-ACK is correctly received by the first communication device. Thus, the second communication device transmits the P-ACK 273, and the first communication device receives the P-ACK 274 in the monitoring period. Then, the first communication device may determine that the packet has been successfully transmitted.

Figure 3:
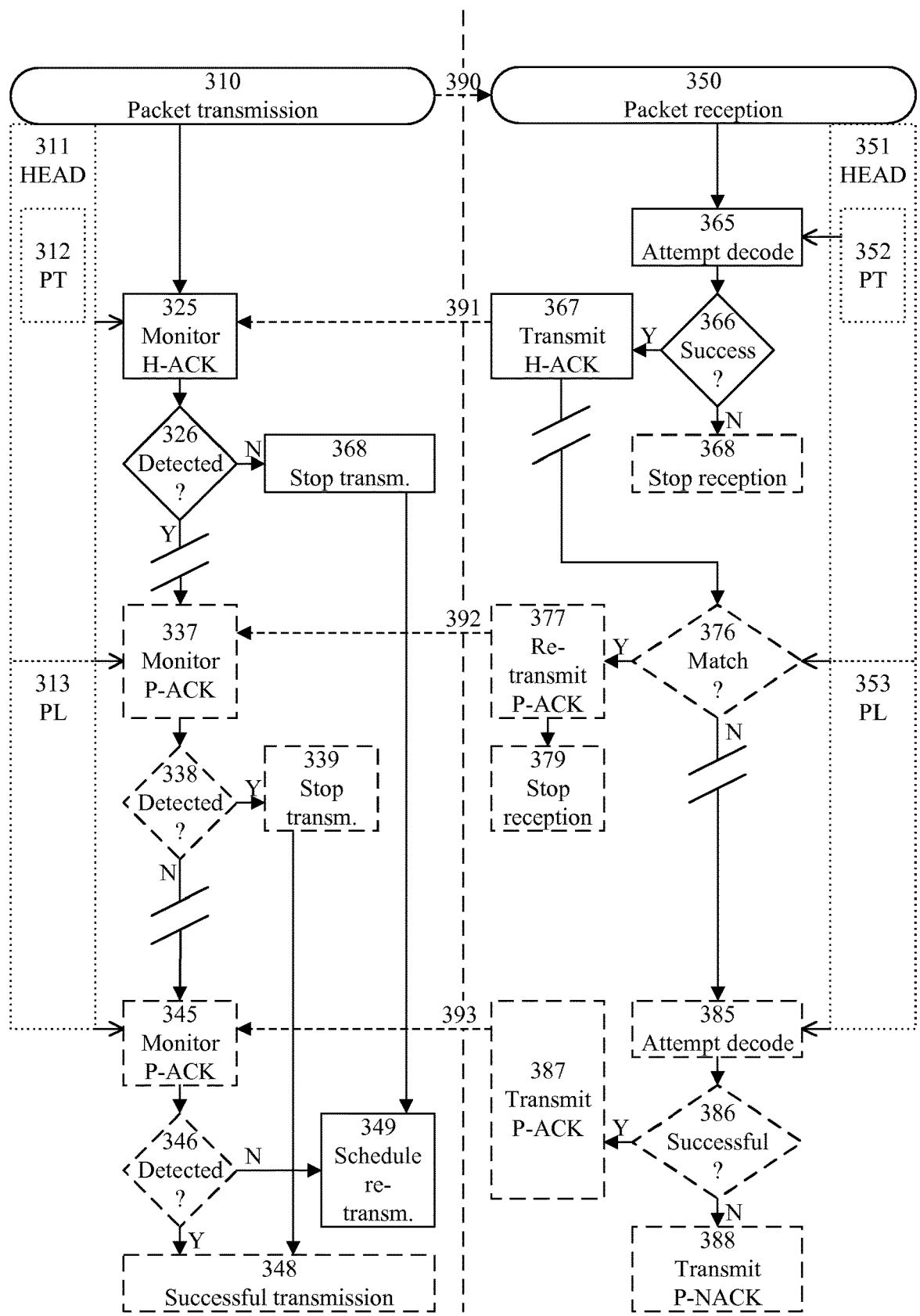
FIG. 3 is a combined flowchart and signaling diagram illustrating example method steps and signaling according to some embodiments.

FIG. 3 is a combined flowchart and signaling diagram illustrating example method steps and signaling according to some embodiments. The left half of FIG. 3 illustrates method steps of a first communication device (capable of simultaneous transmission and reception) for transmission 310, 390 of a packet comprising a header (HEAD) 140, 240, 241, 311, 351 and a payload (PL) 160, 260, 261, 313, 353. The right half of FIG. 3 illustrates method steps of a second communication device (capable of simultaneous transmission and reception) for reception 350, 390 of a packet comprising a header (HEAD) 140, 240, 241, 311, 351 and a payload (PL) 160, 260, 261, 313, 353.

When at least a part (PT) 145, 312, 352 of the header has been transmitted by the first communication device and received by the second communication device, the second communication device attempts to decode the part of the header as illustrated by step 365.

A design principle in IEEE 802.11 is that interleaving over multiple orthogonal frequency division multiplex (OFDM) symbols is not performed. Thereby, the decoder can start decoding immediately upon reception of a symbol. A consequence of this is that the information packaged early in a packet is also decoded early. However, according to the prior art the receiver does not know whether the whole packet was correctly decoded or not until it can compare the data with a frame check sequence (FCS).

When the part of the header is successfully decoded (Y-path out of step 366; compare with scenarios c-f of FIG. 2) the second communication device transmits a header acknowledgement signal (H-ACK) as illustrated by step 367 and signal 391 and continues reception and decoding of the packet. Successful decoding of the part of the header may, for example, comprise determining that a receiver indicator field (compare with 145 of FIG. 1) indicates the second communication device as an intended receiver of the packet. Alternatively or additionally, successful decoding of the part of the header may, for example, comprise determining that an error detection part (e.g., a header CRC or a header FCS) of the header indicates error-free reception and decoding of the part.

When the part of the header is not successfully decoded (N-path out of step 366; compare with scenario b of FIG. 2) the second communication device stops reception (and decoding) of the packet as illustrated by step 368. Hence, no H-ACK is transmitted in this case. Non-successful decoding of the part of the header may, for example, comprise determining that a receiver indicator field (compare with 145 of FIG. 1) does not indicate the second communication device as an intended receiver of the packet. Alternatively or additionally, non-successful decoding of the part of the header may, for example, comprise determining that an error detection part of the header indicates that there are errors in the reception and decoding of the part.

Typically, attempting to decode the part of the header is directly responsive to reception of the part of the header and/or transmission of the H-ACK is directly responsive to decoding the part of the header, when successful.

As mentioned before, transmission of the H-ACK may be simultaneous to continued reception by the second communication device (e.g., prior to, or during, reception of the payload). One or more of steps 365 and 367 may be executed during reception of the rest of the header. Alternatively or additionally, one or more of steps 365 and 367 may be executed during reception of the payload. A time duration may be specified for the second communication device, starting at reception of the part of the header, within which the H-ACK should be transmitted. Alternatively or additionally, a time duration (monitoring period) may be specified for the first communication device, starting at transmission of the part of the header, within which the H-ACK should be received.

When at least a part (PT) 145, 312, 365 of the header has been transmitted by the first communication device, the first communication device monitors receipt of the H-ACK as illustrated by step 325. This step typically comprises monitoring receipt of the H-ACK during a specified monitoring period as mentioned above.

When the H-ACK is received (Y-path out of step 326; compare with scenarios d-f of FIG. 2; H-ACK is detected)

the first communication device continues transmission of the packet. When no H-ACK is received (N-path out of step 326; compare with scenarios b-c of FIG. 2; absence of H-ACK is detected) the first communication device interrupts (stops/cancels/aborts) transmission of the packet as illustrated in step 368 and schedules the packet for retransmission as illustrated by step 349.

As mentioned before, monitoring and reception of the H-ACK may be simultaneous to continued transmission by the first communication device. One or more of steps 325 and 326 may be executed during transmission of the rest of the header. Alternatively or additionally, one or more of steps 325 and 326 may be executed during transmission of the payload.

Typically, the transmission of the header acknowledgement signal may be performed using an acknowledgement modulation and coding scheme that is more robust than a currently applied packet modulation and coding scheme. In this context, a more robust modulation and coding scheme may refer to a modulation and coding scheme that achieves a lower probability of error (e.g., by using one or more of: a lower rate encoding, a lower order modulation, and a shorter information packet). This makes the scenario (c) of FIG. 2 very unlikely. A similar approach may be used for the P-ACK to make the scenario (e) of FIG. 2 very unlikely.

Alternatively or additionally, mitigation of the disadvantage mentioned above in connection with scenario (e) of FIG. 2 (that the packet may be scheduled for retransmission even though it has been correctly received, since the P-ACK was not correctly received by the first communication device) may be achieved by application of steps 376, 377, 379, 337, 338, 339. It should be noted that these steps are optional in relation to the other steps described in connection with FIG. 3. For example, steps 337, 338, 339 may only be relevant for packet retransmissions according to some embodiments.

When the header has been transmitted by the first communication device and received by the second communication device in entirety, the second communication device checks whether the header matches a previously received header of a previously received and successfully decoded packet as illustrated by step 376.

In some embodiments, this may be achieved by utilizing an error detection part (e.g., a header CRC or a header FCS) of the header. For example, a match may be detected if the error detection part of the header indicates error-free reception and decoding of the header and if the header is identical to (possibly differing in some value indicative of a number of transmission attempts for the packet and/or some value indicative of a time resource used for the transmission), a header of a previously received and successfully decoded packet.

When the header matches a previously received header of a previously received and successfully decoded packet (Y-path out of step 376) the second communication device retransmits a previously transmitted packet acknowledgement signal (P-ACK) associated with the previously received and successfully decoded packet as illustrated by step 377 and signal 392 and stops reception of the packet (since it has already been correctly received). Alternatively or additionally, the second communication device may inform the first communication device that the packet has been correctly received previously in any suitable way other than retransmission of the previously transmitted P-ACK.

When the header does not match any previously received header of a previously received and successfully decoded packet (N-path out of step 376) the second communication device continues reception and decoding of the packet.

A time duration may be specified for the second communication device, starting at reception of the header, within which the previously transmitted P-ACK should be transmitted. Alternatively or additionally, a time duration (monitoring period) may be specified for the first communication device, starting at transmission of the header, within which the premature P-ACK should be received.

When the header has been transmitted by the first communication device, the first communication device monitors receipt of the premature P-ACK as illustrated by step 337. This step typically comprises monitoring receipt of the premature P-ACK during a specified monitoring period as mentioned above.

When the premature P-ACK is received (Y-path out of step 338; premature P-ACK is detected) the first communication device interrupts (stops/cancels/aborts) transmission of the packet as illustrated in step 339 and considers the packet as successfully transmitted as illustrated by step 348. When no premature P-ACK is received (N-path out of step 338; absence of premature P-ACK is detected) the first communication device continues transmission of the packet.

Monitoring and reception of the premature P-ACK may be simultaneous to continued transmission by the first communication device. One or more of steps 337 and 338 may be executed during transmission of the payload.

When the payload 160, 313, 353 has been transmitted by the first communication device and received by the second communication device, the second communication device attempts to decode the payload as illustrated by step 385.

When the payload is successfully decoded (Y-path out of step 386; compare with scenarios e-f of FIG. 2) the second communication device transmits a packet acknowledgement signal (P-ACK) as illustrated by step 387 and signal 393. Successful decoding of the packet may, for example, comprise determining that an error detection part (e.g., a CRC or a FCS) 180 indicates error-free reception and decoding.

When payload is not successfully decoded (N-path out of step 386; compare with scenario d of FIG. 2) the second communication device may either do nothing or transmit an explicit packet negative acknowledgement signal (P-NACK) as illustrated by step 388, according to various embodiments. Non-successful decoding of the packet may, for example, comprise determining that an error detection part (e.g., a CRC or a FCS) 180 indicates that there are errors in the reception and decoding.

Transmission of the P-ACK and/or the P-NACK may be simultaneous to continued reception by the second communication device (e.g., reception of a next packet). One or more of steps 385, 386, 387 and 388 may be executed during such continued reception. A time duration may be specified for the second communication device, starting at reception of the payload, within which the P-ACK or P-NACK should be transmitted. Alternatively or additionally, a time duration (monitoring period) may be specified for the first communication device, starting at transmission of the payload, within which the P-ACK or P-NACK should be received.

When the payload 160, 313, 353 has been transmitted by the first communication device, the first communication device monitors receipt of the P-ACK as illustrated by step 345. This step typically comprises monitoring receipt of the P-ACK during a specified monitoring period as mentioned above.

When the P-ACK is received (Y-path out of step 346; compare with scenario f of FIG. 2; P-ACK is detected) the first communication device considers the packet as successfully transmitted as illustrated by step 348. When no P-ACK is received (N-path out of step 346; compare with scenarios d-e of FIG. 2; absence of P-ACK is detected) the first communication device schedules the packet for retransmission as illustrated by step 349. The case that no P-ACK is received may comprise receiving nothing during the monitoring step 345 or may comprise receiving the explicit P-NACK as transmitted in step 388 (i.e., detection of absence of the P-ACK may comprise detection of an explicit P-NACK).

As mentioned before, monitoring and reception of the P-ACK and/or the P-NACK may be simultaneous to continued transmission by the first communication device. One or more of steps 345, 246, 349 and 348 may be executed during such continued transmission.

Generally, the monitoring period(s) may be statically determined beforehand or may be semi-static or dynamic. Particulars of the monitoring period(s) may, for example, be signaled from the second communication device to the first communication device, or may be determined by the first communication device based on measurements of a round-trip time including decoding. Example monitoring periods may be in the interval of 0.5-5.0 microseconds, e.g., 0.8, 1.6, or 4.0 microseconds.

Generally, the packet acknowledgement signal (P-ACK) may be seen as an acknowledgement signal for the entire packet or for only part of the packet (e.g., the payload; then it may be termed a payload acknowledge signal).

In some embodiments, an indication (e.g., a CQI or a CSI) of a recommended packet modulation and coding scheme (MCS) may be transmitted together with the H-ACK. When the H-ACK is received by the first communication device, the recommended packet modulation and coding scheme may be used for transmission of an immediately subsequent packet. This makes the MCS adaptation faster than if the indication was received after transmission of the entire packet, in which case the recommended packet modulation and coding scheme cannot be used for transmission of an immediately subsequent packet since transmission of such packet has already commenced.

For example, in IEEE 802.11 there is a mechanism called MCS feedback. From 802.11n and onwards, there is a HT Control field in the header, which contains an MCS suggestion. The second communication device monitors the quality of a received transmission and provides feedback to the transmitter about the best MCS choice. Including this MCS suggestion in the H-ACK transmission improves the MCS adaptation speed.

In some embodiments, the method described in FIG. 3 may be dynamically enabled/disabled. For example, the first and second communication devices may inform each other of whether or not they are capable of simultaneous transmission and reception (and/or whether or not they are capable of using the H-ACK approach for other reasons), and the method described in FIG. 3 may be enabled only if both of the first and second communication devices are capable, e.g., of simultaneous transmission and reception. For example, the capability can be signaled using a single bit. One possibility is to use a bit in the PHY signal (SIG) field (in the PHY header or preamble). Alternatively or additionally, enabling/disabling may be based on a desire of either of the first and second communication devices to apply the H-ACK approach. Such desire may also be signaled between the first and second communication devices as suitable.

Since IEEE 802.11ac, it is common practice to use the aggregated MPDU for data transmission. Even though the need for aggregated MPDU (A-MPDU), wherein several MAC layer packets are collected into one PHY layer packet, is significantly reduced when a system has FD capability (since the overhead of waiting for an ACK is removed, and since interframe spacing (IFS) overhead is not needed), it may be noteworthy that the approaches described herein may be equally applicable for A-MPDU. Then, each MAC layer packet may be associated with a respective H-ACK (and a respective P-ACK). There are still some advantages with A-MPDU, e.g., that preamble and signal (SIG) field overhead may be removed, since the preamble may be reduced to a single SIG field (i.e., aggregated physical layer convergence procedure, PCLP, service data unit, A-PSDU, encapsulation).

Figure 4:
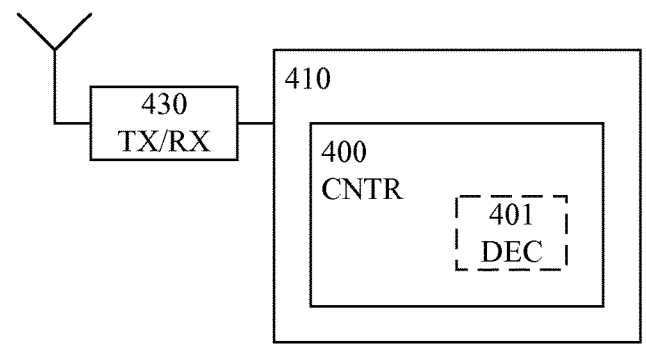
FIG. 4 is a schematic block diagram illustrating an example arrangement (apparatus) according to some embodiments.
Figure 5:
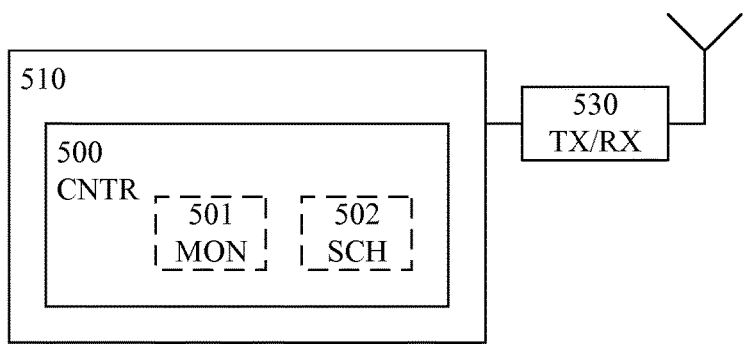
FIG. 5 is a schematic block diagram illustrating an example arrangement (apparatus) according to some embodiments.

FIGS. 4 and 5 schematically illustrate example apparatuses according to some embodiments for transceivers and/or communication devices capable of simultaneous transmission and reception. A communication device may, for example, be a wireless communication device (e.g., a user equipment, UE, or a station, STA) or a network node (e.g., a base station, BS, a NodeB, an evolved NodeB, or an access point, AP).

FIG. 4 illustrate an example apparatus 410 for reception of a packet comprising a header and a payload. The apparatus comprises controlling circuitry (CNTR; e.g., a controller or a controlling module) 400. The controlling circuitry may be adapted to cause execution of one or more steps of the right half of FIG. 3.

The controlling circuitry is configured to cause reception of at least a part of the header, the header in entirety, and the payload. To this end, the controlling circuitry may be associated with (e.g., (operably) connectable, or connected, to) receiving circuitry (e.g., a receiver or a receiving module; illustrated in FIG. 4 as part of transceiving circuitry, TX/RX) 430. The receiving circuitry may be configured to receive at least a part of the header, the header in entirety, and the payload.

The controlling circuitry is also configured to cause an attempt to decode the part of the header (compare with step 365 of FIG. 3), the header in entirety (compare with step 376 of FIG. 3), and the payload (compare with step 385 of FIG. 3). To this end, the controlling circuitry may comprise, or be otherwise associated with (e.g., (operably) connectable, or connected, to), decoding circuitry (DEC; e.g., a decoder or a decoding module) 401. The decoding circuitry may be configured to attempt to decode the part of the header, the header in entirety, and the payload.

The controlling circuitry is further configured to cause—responsive to the part of the header being successfully decoded—transmission of a header acknowledgement signal (compare with step 367 of FIG. 3).

The controlling circuitry may be further configured to cause—responsive to the header matching a previously received header of a previously received and successfully decoded packet—retransmission of a previously transmitted packet acknowledgement signal associated with the previously received and successfully decoded packet (compare with step 377 of FIG. 3).

The controlling circuitry may be further configured to cause—responsive to the payload being successfully decoded—transmission of a packet acknowledgement signal (compare with step 387 of FIG. 3).

To this end, the controlling circuitry may be associated with (e.g., (operably) connectable, or connected, to) transmitting circuitry (e.g., a transmitter or a transmitting module; illustrated in FIG. 4 as part of transceiving circuitry, TX/RX) 430. The transmitting circuitry may be configured to transmit the header acknowledgement signal and the packet acknowledgement signal, and to retransmit the previously transmitted packet acknowledgement signal.

FIG. 5 illustrates an example apparatus 510 for transmission of a packet comprising a header and a payload. The apparatus comprises controlling circuitry (CNTR; e.g., a controller or a controlling module) 500. The controlling circuitry may be adapted to cause execution of one or more steps of the left half of FIG. 3.

The controlling circuitry is configured to cause transmission of at least a part of the header, the header in entirety, and the payload. To this end, the controlling circuitry may be associated with (e.g., (operably) connectable, or connected, to) transmission circuitry (e.g., a transmitter or a transmitting module; illustrated in FIG. 5 as part of transceiving circuitry, TX/RX) 530. The transmitting circuitry may be configured to transmit at least a part of the header, the header in entirety, and the payload.

The controlling circuitry may also be configured to cause monitoring receipt of a header acknowledgement signal (compare with step 325 of FIG. 3), a premature packet acknowledgment signal (compare with step 337 of FIG. 3), and a packet acknowledgement signal (compare with step 345 of FIG. 3). To this end, the controlling circuitry may comprise, or be otherwise associated with (e.g., (operably) connectable, or connected, to), monitoring circuitry (MON; e.g., a monitor or a monitoring module) 501. The monitoring circuitry may be configured to monitor receipt of a header acknowledgement signal, a premature packet acknowledgment signal, and a packet acknowledgement signal.

The controlling circuitry is further configured to cause—responsive to detection of absence of the header acknowledgement signal—interruption of the transmission of the packet and scheduling of the packet for retransmission (compare with steps 368 and 349 of FIG. 3).

The controlling circuitry may be further configured to cause—responsive to detection of the premature packet acknowledgement signal—interruption of the transmission of the packet (compare with step 339 of FIG. 3).

The controlling circuitry may be further configured to cause—responsive to detection of absence of the packet acknowledgement signal—scheduling of the packet for retransmission (compare with step 349 of FIG. 3).

To this end, the controlling circuitry may be associated with (e.g., (operably) connectable, or connected, to) scheduling circuitry (SCH e.g., a scheduler or a scheduling module) 502. The scheduling circuitry may be configured to interrupt transmission of the packet and schedule the packet for retransmission.

As mentioned above, advantages of some embodiments includes that alternative feed-back mechanisms for wireless communication are provided, that the alternative feed-back mechanisms provide improvement in adaptations to the communication setting (e.g., one or more of: MCS selection, retransmission decision, and transmission interruption), and that the alternative feed-back mechanisms enable faster adaptations due to decreased latency of the feed-back.

Time efficiency may be improved by stopping erroneously sent packets early. Application of some embodiments enables stopping/interrupting a transmission early (before the entire packet is transmitted) when the part of the header is not decoded successfully. Simulations show that the overall rate is improved by such approaches.

Speed of rate adaptation may also be improved by faster MCS feedback. In the prior art, a MCS feedback can only be sent at earliest with the ACK for the full packet. If the next packet from the transmitter is scheduled to be transmitted immediately after the ACKed full packet, the transmitter may not have time to re-encode it to adapt to the MCS feedback. However, with application of some embodiments, a MCS feedback arrives with the H-ACK, which is typically before the encoding of a next packet has started. Thus, the speed of the rate adaptation can be improved by at least one packet.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a user equipment, UE, or a station, STA) or a network node (e.g., a base station, BS, a NodeB, an evolved NodeB, or an access point, AP).

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 6:
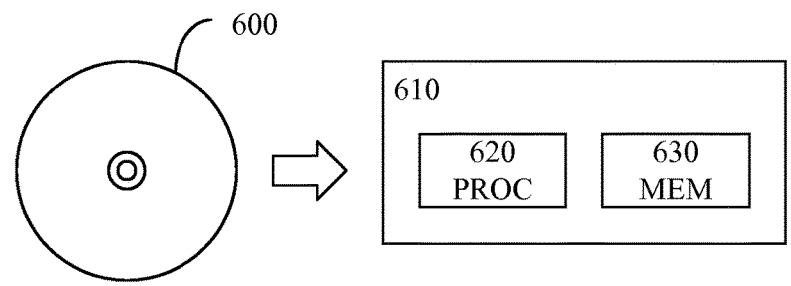
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a wireless communication device or a network node 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIG. 3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for a communication device capable of simultaneous transmission and reception, wherein the method is for transmission of a packet comprising a header and a payload, the method comprising the communication device:
   transmitting at least a part of the header;
   monitoring receipt of a header acknowledgement signal;
   when absence of the header acknowledgement signal is detected, interrupting the transmission of the packet and scheduling the packet for retransmission; and
   when a header acknowledgement signal is received and includes an indication of a recommended packet modulation and coding scheme, using the recommended packet modulation and coding scheme for transmission of a subsequent packet.

2. The method of claim 1, further comprising:
   transmitting the header in entirety;
   monitoring receipt of a premature packet acknowledgment signal; and
   when the premature packet acknowledgement signal is detected, interrupting the transmission of the packet.

3. The method of claim 1, further comprising:
   transmitting the payload;
   monitoring receipt of a packet acknowledgement signal; and
   when absence of the packet acknowledgement signal is detected, scheduling the packet for retransmission.

4. The method of claim 1, wherein the part of the header comprises a header field indicative of a packet recipient address.

5. A non-transitory computer readable recording medium storing a computer program product for controlling a communication device for transmission of a packet comprising a header and a payload, the computer program product comprising program instructions which, when run on processing circuitry of the communication device, causes the communication device to:
   transmit at least a part of the header;
   monitor receipt of a header acknowledgement signal;
   when absence of the header acknowledgement signal is detected, interrupt the transmission of the packet and schedule the packet for retransmission; and
   when a header acknowledgement signal is received and includes an indication of a recommended packet modulation and coding scheme, using the recommended packet modulation and coding scheme for transmission of a subsequent packet.

6. An apparatus for a communication device capable of simultaneous transmission and reception, wherein the apparatus is for transmission of a packet comprising a header and a payload, the apparatus comprising controlling circuitry configured to cause:
   processing circuitry;
   memory containing instructions executable by the processing circuitry whereby the apparatus is operative to function as controlling circuitry configured to cause:
   transmission of at least a part of the header;
   monitoring of receipt of a header acknowledgement signal; and
   responsive to detection of absence of the header acknowledgement signal, interruption of the transmission of the packet and scheduling of the packet for retransmission; and
   when a header acknowledgement signal is received and includes an indication of a recommended packet modulation and coding scheme, using the recommended packet modulation and coding scheme for transmission of a subsequent packet.

7. The apparatus of claim 6, wherein the controlling circuitry is further configured to cause:
   transmission of the header in entirety;
   monitoring of receipt of a premature packet acknowledgment signal; and
   responsive to detection of the premature packet acknowledgement signal, interruption of the transmission of the packet.

8. The apparatus of claim 6, wherein the controlling circuitry is further configured to cause:
   transmission of the payload;
   monitoring of receipt of a packet acknowledgement signal; and
   responsive to detection of absence of the packet acknowledgement signal, scheduling of the packet for retransmission.

9. The apparatus of claim 6, wherein the controlling circuitry is further configured to cause reception of an indication of a recommended packet modulation and coding scheme together with the header acknowledgement signal, and use of the recommended packet modulation and coding scheme for transmission of an immediately subsequent packet.

* * * * *